United States Patent [19]

Brunner

[11] 4,329,692

[45] May 11, 1982

[54] PRIMARY RADAR ANTENNA HAVING A SECONDARY RADAR ANTENNA INTEGRATED THEREWITH

[75] Inventor: Anton Brunner, Wangen, Fed. Rep. of Germany

[73] Assignee: Siemens Aktiengesellschaft, Berlin & Munich, Fed. Rep. of Germany

[21] Appl. No.: 151,767

[22] Filed: May 21, 1980

[30] Foreign Application Priority Data

Jun. 21, 1979 [DE] Fed. Rep. of Germany ....... 2925104

[51] Int. Cl.$^{3}$ ............................................ H01Q 13/00

[52] U.S. Cl. .................................... 343/780; 343/725

[58] Field of Search ................ 343/779, 780, 776–778, 343/725, 754, 756, 840, 6.5 R, 6.5 LL, 6.5 SS, 6.8 R, 6.8 LC, 6 R

[56] References Cited

U.S. PATENT DOCUMENTS

| | | | |
|---|---|---|---|
| 2,436,408 | 2/1948 | Tawney | 343/780 |
| 2,526,675 | 10/1950 | Litchford | 343/780 |
| 3,716,862 | 2/1973 | Willoughby | 343/780 |
| 3,945,009 | 3/1976 | Trignon | 343/7.7 |
| 4,187,507 | 2/1980 | Crane et al. | 343/780 |

*Primary Examiner*—David K. Moore

*Attorney, Agent, or Firm*—Hill, Van Santen, Steadman, Chiara & Simpson

[57] ABSTRACT

A primary radar antenna, designed as a pillbox antenna, has an IFF antenna integrated therewith. Excellent properties with regard to compactness, radiation and frequency dependency are achieved through the combination of a pillbox antenna with a multiple IFF antenna composed of a plurality of radiator elements, which is applied on the upper side of the pillbox antenna for radiation of the IFF signals. The antenna is particularly suitable as a combined primary radar/IFF antenna for smaller vehicles.

41 Claims, 6 Drawing Figures

29 30 31 34 28 3 33 10 11 1 12 8 7 6 5 4 2 9 32 IFF

1
II
II
20
14
15
16
20
22
23
Σ
23
Δ
21
17
18
19
21
13
3

17
18
19
13
5
23
13
3
10
11
1
12
8
7
6
5
4
2
9
IFF 1
24
25
26
27
33
IV
IV
28
29
30
31
3

29
30
31
34
28
3
33
10
11
1
12
8
7
6
5
4
2
9
32
IFF 42
41
40
39
38
37
36
35
45
44
43
1
3
VI
Δ
Σ

46
35
45
44
3
10
11
1
12
8
7
6
5
4
2
9
IFF

PRIMARY RADAR ANTENNA HAVING A SECONDARY RADAR ANTENNA INTEGRATED THEREWITH

CROSS REFERENCE TO RELATED APPLICATION

This application is related to a co-pending application of Anton Brunner, Ser. No. 151,737, filed May 20, 1980.

BACKGROUND OF THE INVENTION

1. Field of the Invention

The present invention relates to a radar antenna, designed as a pillbox antenna, and more particularly to such an antenna which has a secondary radar antenna or Identification-Friend-Foe (IFF) antenna integrated therewith.

2. Description of the Prior Art

Primary radar antennas and IFF antennas can be designed to be structurall separate, for example, in the form of a pillbox antenna and an IFF bar antenna, and can then be combined, for example, spatially above one another. Also, a bar antenna with a series-fed radar antenna and an integrated IFF bar antenna is known in the art. The disadvantage of a series-fed radar antenna, for example, a waveguide slot antenna, is in its narrow-band characteristics and, in particular, in the frequency-dependency of the direction of maximum radiation.

SUMMARY OF THE INVENTION

It is therefore the object of the present invention to provide a very compact, low radar antenna comprising an integrated IFF antenna, which is suitable for accommodation on small vehicles, and which exhibits optimum properties in the horizontal plane within a large frequency bandwidth.

According to the invention, the above object is achieved by providing that the IFF antenna is a radiator group composed of a plurality of radiator elements, the group being mounted in the upper side of a pillbox antenna.

As is known, a simple pillbox antenna is formed by a cylindrical parabolic reflector and two metallic plates which are perpendicular to the reflector and which extend parallel to one another spaced apart a distance of less than 1 wavelength. The feed of such an antenna takes place at the focal line. A fan-shaped radiation lobe results.

The pillbox antenna for the radar signals can also be designed in a bilevel manner in accordance with a further development of the invention. Such a bilevel or folded pill-box antenna which is known per se, comprises a cylindrical parabolic reflector and two metallic plates perpendicular to the reflector and extending parallel to one another, with an intermediate plate extending parallel to these two plates, but not extending to the parabolic reflector. On both sides of the intermediate plate inter-plate spaces result. The radar signal primary radiator is arranged with its radiation center in the focal line of the cylindrical parabolic reflector in the lower inter-plate space. Along the cylindrical parabolic reflector an insulation for deflecting the radiation from one inter-plate space into the other is provided. Such a bilevel pillbox antenna therefore exhibits the advantage that the aperture does not become partially shadowed by the primary radiator.

The radiator elements of the IFF antenna can be arranged in a single row or in two rows extending parallel to one another, in particular, in such a manner that the multiple antenna operates as an end-on or end-fire directional array. The radiator elements can then be formed, for example, by slots which are secured in a metallic surface extending at least approximately parallel to the upper side of the pillbox antenna, and thus form a flat top or planar antenna. The slots can be energized by a microstrip line, such as a triplate line, so that the phase at the slots causes a virtually tangential direction of maximum radiation. In the framework of the microstrip transmission line, a circuit for the formation of the sum and difference signals from the signals of the two IFF radiators, formed by two rows of slots, is advantageously provided. Apparatus may also be provided for changing the angle of inclination between the flat top antenna and the upper side of the pillbox antenna so that the direction of maximum radiation of the IFF antenna can be adjusted with respect to the angle of elevation.

Instead of slots, the radiator elements can also be realized by unipole rods mounted perpendicularly on the upper side of the pillbox antenna, of which rods, in every row, only one is fed and the remainder are parasitic radiator elements. The unipole feed, as well as a circuit for the formation of the sum and difference signals from the signals of the two IFF radiators, formed by two unipole rod rows, can be realized by means of a coaxial line integrated in the housing of the pillbox antenna.

The radiator elements of the IFF antenna can also be arranged in a single row, in particular, in such a fashion that the multiple antenna operates as a broadside array. The radiator elements in this instance can likewise be realized by unipole rods mounted perpendiculary on the surface on the pillbox antenna, which, however, are fed in parallel. In order to shield the rear region, a reflector wall is advantageously provided perpendicularly to the pillbox housing behind the transversely radiating broadside array. The unipole rod feed, as well as, in the case of a subdivision of the multiple antenna into a left sub-group and into a right sub-group, also a circuit for the formation of the sum and difference signals from the signals of the two IFF radiators formed by the two sub-groups can be realized by a coaxial line integrated in the housing of the pillbox antenna.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
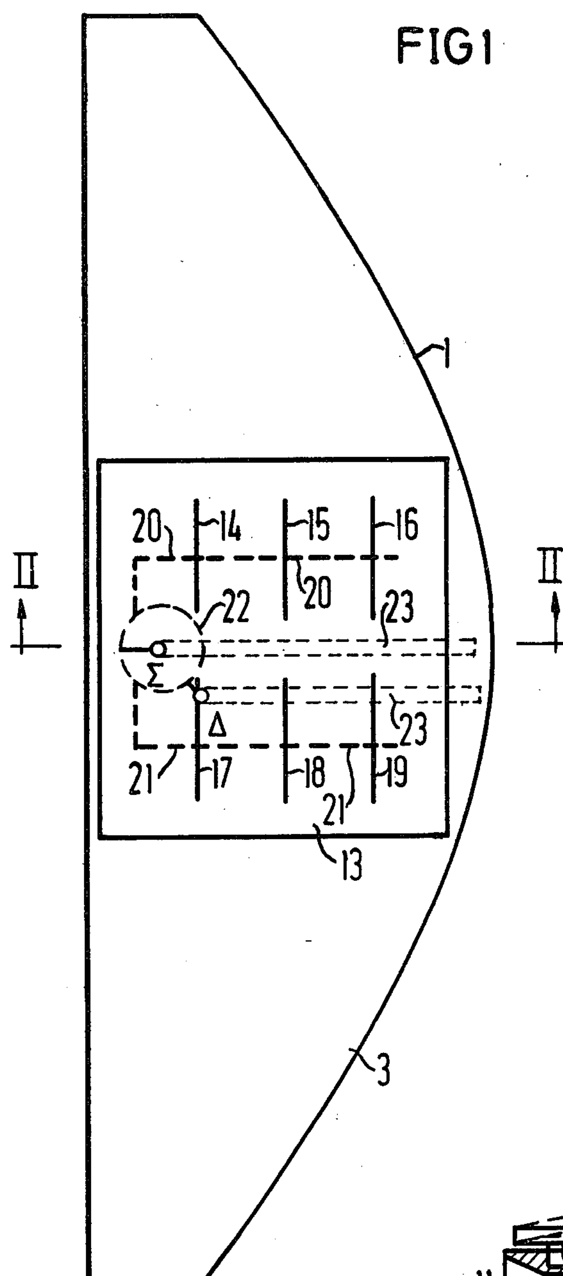
FIG. 1 is a plan view of an integrated antenna structure including a bilevel pillbox antenna for primary radar signals and an IFF flat top antenna for secondary radar signals, constructed in accordance with the present invention.
Figure 2:
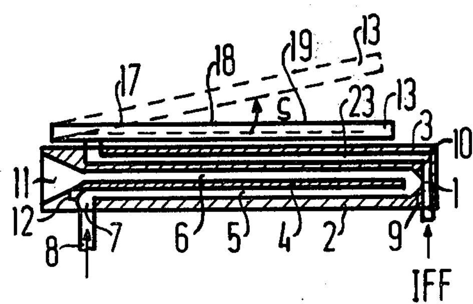
FIG. 2 is a sectional view taken substantially along the line II—II of FIG. 1.

Referring to FIGS. 1 and 2, a bilevel pillbox antenna comprises a cylindrical parabolic reflector 1 and two metallic plates 2 and 3 arranged perpendicular to the reflector 1 and extending parallel to one another, with an intermediate plate 4 therebetween which does not extend to the parabolic reflector 1. The intermediate plate 4 extends parallel to the two plates 2 and 3. On each side of the intermediate plate 4 an interplate space 5, 6 results. In the focal line of the parabolic reflector 1 a radar signal primary radiator 7 is arranged with its radiation center in the interplate space 5. The radar signal primary radiator 7 can be designed, for example, as an open waveguide or as a small horn-type radiator, for example a deflection horn-type radiator as is illustrated in FIGS. 1-6. The radar signal coming from a supply 8 is thus coupled into the interplate space 5 by way of the primary radiator 7. The radiation transition from the lower interplate space 5 into the upper interplate space 6 occurs, in the arrangement illustrated in FIGS. 1 and 2, with the aid of two 45° surfaces 9 and 10 in the cross-sectional profile of the cylindrical parabolic reflector 1. The radiation deflection can also occur by the provision of a simple slot between the intermediate plate 4 and the cylindrical parabolic reflector 1. The intermediate plate 4 can be mounted, for example, in a support mount comprising dielectric material extending along the cylindrical parabolic reflector 1. Such a support mount of the intermediate plate 4 may be preferred to the utilization of discrete spacing pins, since, through such pins, interfering inhomogeneity locations can occur. Before the aperture of the upper interplate space 6, a funnel-shaped opening 11 is provided in order to render possible the desired beaming of the radar signal radiation. The lower interplate space 5 is closed off with a metallic wall 12 on the side which faces away from the cylindrical parabolic reflector 1.

An IFF antenna integrated with the primary radar antenna is secured on an upper plate 3 as a flat top antenna 13 on the pillbox antenna. In the flat top antenna 13, two mutually parallel extending rows of slots 14, 15, 16 and 17, 18, 19 are provided, the slots extending transversely to the direction of maximum radiation of the pillbox antenna. The slots 14–19 are energized by a triplate line or a microstrip line 20, 21, such that their phase brings about a virtually tangential direction of maximum radiation. Within the framework of the microstrip transmission line, a circuit 22 is provided for the formation of the sum and difference signals from the signals of the IFF radiators formed by the two rows of slots. An apparatus for changing the angle of incidence $\delta$ between the flat top antenna 13 and the upper side of the pillbox antenna makes it possible.to provide different inclinations of the flat top antenna 13, so that the direction of maximum radiation can be adjusted. In the pillbox housing, feed lines are provided for feeding the sum and difference signals for the circuit 22. Due to the end-on directional array characteristic which results from the axial arrangement of the radiating elements, i.e. the slots 14–19, the IFF major lobe is more strongly beamed not only in the horizontal plane, but also in the vertical plane.

Figure 3:
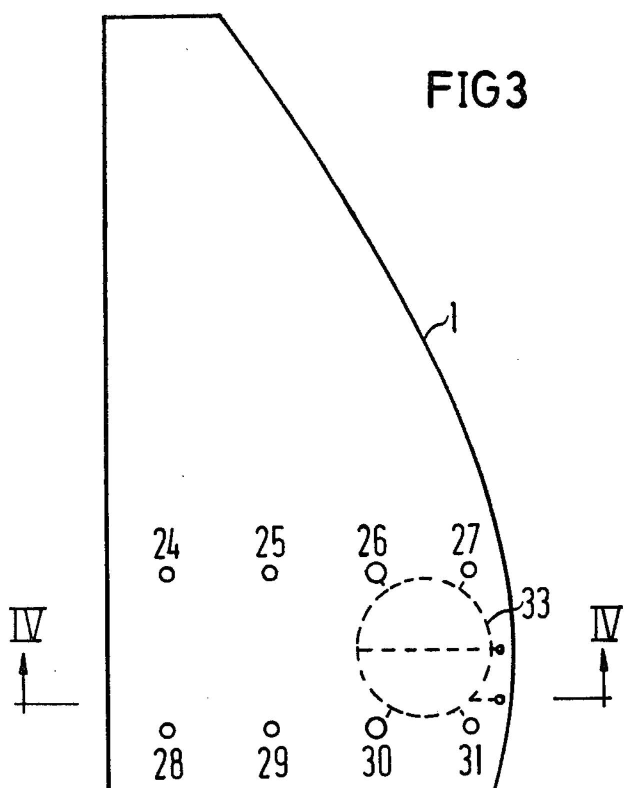
FIG. 3 is a plan view of a bilevel pillbox antenna and an IFF antenna constructed in accordance with another embodiment of the invention.
Figure 4:
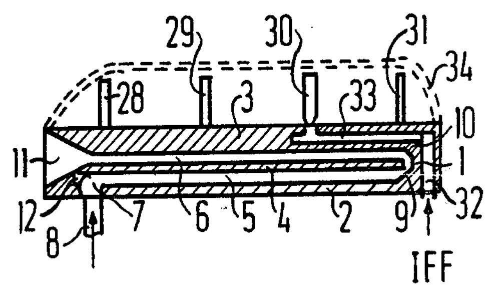
FIG. 4 is a sectional view taken substantially along the line IV—IV of FIG. 3.

The integrated primary radar/IFF antenna, illustrated in FIGS. 3 and 4, comprises, for the radiation of primary radar signals, a pillbox antenna which corresponds to that of FIGS. 1 and 2. Therefore, a detailed description thereof will be omitted. The radiator elements of the IFF antenna are formed by unipole rods 24–31, mounted perpendicularly on the upper side of the pillbox antenna. The rods 24–27 are arranged in one row and the rods 28–31 are arranged in another row parallel thereto. In each row only one unipole rod 26 or 30, respectively, is fed. The remaining unipole rods are only parasitic radiator elements with suitable distances and lengths and serve as directors 24, 25 and 28, 29, and reflectors 27, 31, for the purpose of increasing the directional effect. The feed of the unipole rods 26 and 30 occurs by way of a coaxial line 32 integrated in the pillbox housing. In addition, a circuit 33 for forming the sum and difference signals from the signals of the two IFF radiators formed by the two unipole rod rows is provided, the circuit 33 being likewise formed by a coaxial line integrated in the housing of the pillbox antenna. As a mechanical and climatic protection, for example, a synthetic cover (radome) 34 can be applied over all of the rods 24–31, or in a thin-like fashion, separate covers can be applied over the rows of rods, respectively. Also the IFF antenna, integrated corresponding FIGS. 3 and 4, which is constructed as a Yagi-like unipole array, exhibits an end-on directional characteristic and beams the major lobe in both planes.

Figure 5:
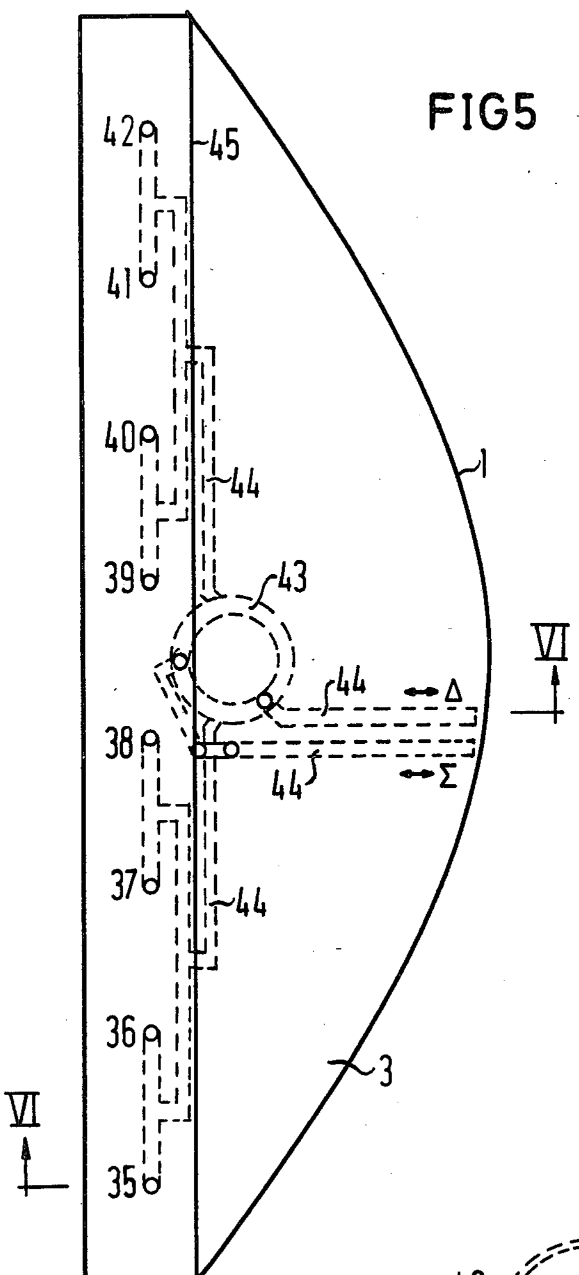
FIG. 5 is a plan view of another embodiment of a bilevel pillbox antenna and an IFF antenna constructed in accordance with the present invention.
Figure 6:
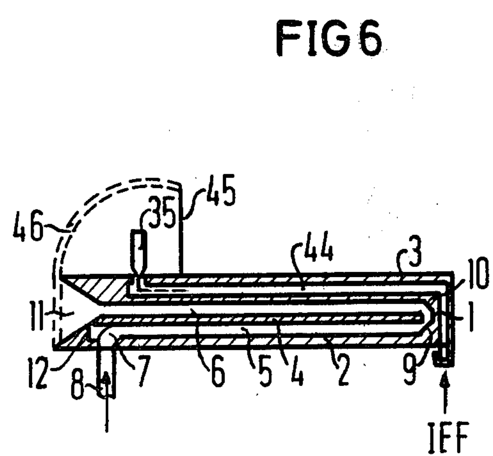
FIG. 6 is a sectional view taken substantially along the line VI—VI of FIG. 5.

The embodiment illustrated in FIGS. 5 and 6 exhibits, for the purpose of primary radar signal radiation, a bilevel pillbox antenna which corresponds to that according to FIGS. 1 and 2. Therefore, description of this structure is not necessary. The radiator elements of the integrated IFF antenna are formed by unipole rods 34–42 which are mounted perpendicularly on the surface of the pillbox antenna. The rods are arranged in a single row, in particular in such a manner that the multipe antenna operates as a broadside array (or transverse radiator). The multiple antenna is here separated into a left component sub-group and into a right component sub-group. The left component sub-group comprises the unipole rods 35–38, while the right component sub-group comprises the unipole rods 39–42. The feed for the unipole rods 35–42 occurs on a parallel basis. The unipole feed, as well as a circuit for the formation of the sum and difference signals 43 from the signals of the two IFF radiators formed by the two component sub-groups, are realized by way of a coaxial line 44 which is integrated in the housing of the pillbox antenna. Behind the unipole rods 35–42 a reflector wall 45 is provided, standing perpendicuarly on the pillbox housing, and serving the purpose of shielding the rear region. In order to cover the unipoe rods 35–42, and also the opening 11 of the pillbox antenna, a radome 46 is provided, the radome being mounted on its one side on the upwardly projecting end of the reflector 45.

It should be additionally pointed out that, in the case of all exemplary embodiments of integrated primary radar/IFF antennas in accordance with the present invention, which are illustrated in FIGS. 1-6, instead of the bilevel pillbox antenna for radiating the primary radar signals, also a simple pillbox antenna can be employed; however, the above-mentioned advantages of the bilevel pillbox antenna will no longer be available.

Although I have described my invention by reference to particular illustrative embodiments thereof, many changes and modifications of the invention may become apparent to those skilled in the art without departing from the spirit and scope of the invention. I therefore intended to include within the patent warranted hereon all such changes and modifications as may reasonably and properly be included within the scope of my contribution to the art.

I claim:

1. A radar antenna comprising:
a primary radar antenna constructed as a pillbox antenna, said primary radar antenna comprising a cylindrical parabolic reflector, two metallic plates perpendicular to said parabolic reflector and parallel to one another, said plates being spaced apart less than one wave length, and a primary radiator disposed between said plates on the focal line of said parabolic reflector; and
an integrated IFF antenna integrated with said pillbox antenna,
said IFF antenna comprising a multiple radiator group including a plurality of radiator elements carried on the upper side of said pillbox antenna.

2. The antenna of claim 1, wherein:
said radiator elements are arranged in at least one row and operate as an end-on directional array.

3. The antenna of claim 1, wherein:
said radiator elements are arranged in at least two parallel rows and operate as an end-on directional array.

4. The antenna of claim 2, wherein:
said radiator elements comprise a further plate and means defining slots in said metal plate, said metal plate extending essentially parallel to said pillbox antenna as a planar antenna.

5. The antenna of claim 4, and further comprising:
microstrip transmission lines on said metal plate for providing energizing energy to said slots.

6. The antenna of claim 5, wherein:
said microstrip transmission lines are constructed as triplate transmission lines.

7. The antenna of claim 5, and further comprising:
a sum and difference circuit connected to said microstrip transmission lines.

8. The antenna of claim 7, and further comprising:
means for adjusting the angle of incidence between said further metal plate and said pillbox antenna.

9. The antenna of claim 1, wherein:
said radiator elements comprise unipole rods mounted in rows perpendicularly to the upper side of said pillbox antenna; and
feed means for feeding one such rod in each row, the remainder of said rods constituting parasitic radiators.

10. The antenna of claim 9, wherein said feed means comprises:
a coaxial line integrated in said pillbox antenna including a sum and difference circuit.

11. The antenna of claim 10, and further comprising:
a radome covering said unipole rods.

12. The antenna of claim 10, and further comprising:
a plurality of radomes each covering a respective row of said unipole rods.

13. The antenna of claim 1, wherein:
said radiator elements are arranged in a single row and operate as a broadside array.

14. The antenna of claim 13, wherein:
said radiator elements comprise parallel fed unipole rods mounted perpendicularly to the upper side of said pillbox antenna.

15. The antenna of claim 14, and further comprising:
a reflector wall mounted perpendicularly to the upper surface of said pillbox antenna behind said radiator elements.

16. The antenna of claim 14, wherein:
said radiator elements are divided into a left-hand component group and a right-hand component group.

17. The antenna of claim 14, and further comprising:
a coaxial transmission line means integrated in said pillbox antenna including a sum and difference circuit.

18. The antenna of claim 14, and further comprising:
a radome covering said radiator elements.

19. The antenna of claim 18, and further comprising:
a reflector mounted perpendicularly to said pillbox antenna; and wherein
said radome includes a side mounted on said reflector.

20. A radar antenna comprising:
a primary radar antenna including
a cylindrical parabolic reflector,
a pair of parallel plates spaced apart and extending perpendicular to said cylindrical parabolic reflector,
an intermediate plate between and parallel to said pair of plates and providing upper and lower interplate spaces therebetween, said intermediate plate extending to a point spaced from said cylindrical parabolic reflector to communicate said inter plate spaces, said plates defining a primary radiator having a focal line, and
a primary radar signal feed mounted to feed at said focal line; and
a secondary radar antenna mounted on the upper one of said pair of plates, including a plurality of radiator elements.

21. The antenna of claim 20, and further comprising:
deflection means at the point of communication between said interplate spaces.

22. The antenna of claim 20, wherein:
said primary radar antenna comprises a horn-shaped radiator.

23. The antenna of claim 22, wherein:
said horn-shaped radiator comprises a deflection horn-type radiator.

24. The antenna of claim 20, wherein:
said primary radar antenna comprises an open wave guide.

25. The antenna of claim 20, and further comprising:
180° deflection means at said cylindrical parabolic reflector communicating with said interplate spaces.

26. The antenna of claim 25, wherein:
said deflection means comprises a pair of reflectingly cooperable 45° surfaces.

27. The antenna of claim 20, and further comprising:
mounting means for said intermediate plate including dielectric material extending along the length of said cylindrical parabolic reflector.

28. The antenna of claim 20, and further comprising:
a vertical wall at the forward end of the lower one of said interplate spaces; and
a primary radar feed communicating with said lower interspace adjacent said vertical wall.

29. The antenna of claim 20, wherein said primary radar antenna comprises:
means defining a funnel-shaped opening towards the exterior from the upper one of said interplate spaces.

30. A radar antenna comprising:

a primary radar antenna having a forward end and a rearward end and including
- a cylindrical parabolic reflector,
- first and second parallel plates extending spaced apart forwardly of said cylindrical parabolic reflector, and a third plate parallel and intermediate said first and second plates and spaced from said cylindrical parabolic reflector to define, with said first and second plates, upper and lower communicating interplate spaces,
- wave deflection means at the junction of said first and second plates and said cylindrical parabolic reflector,
- means defining a radiation opening at the forward end of said upper interplate space,
- means closing the forward end of said lower interplate space, and
- first feed means communicating with said lower interplate space for feeding in a primary radar signal; and a secondary radar antenna mounted on top of said primary radar antenna, including
- a plurality of radiator elements, and
- second feed means communicating with at least one of said radiator elements adjacent said cylindrical parabolic reflector.

31. A radar antenna comprising:

a primary radar antenna having a forward end and a rearward end and including
- a cylindrical parabolic reflector,
- first and second parallel plates extending spaced apart forwardly of said cylindrical parabolic reflector, and a third plate parallel and intermediate said first and second plates and spaced from said cylindrical parabolic reflector to define, with said first and second plates, upper and lower communicating interplate spaces,
- wave deflection means at the junction of said first and second plates and said cylindrical parabolic reflector,
- means defining an radiation opening at the forward end of said upper interplate space,
- means closing the forward end of said lower interplate space, and
- first feed means communicating with said lower interplate space for feeding in a primary radar signal; and a secondary radar antenna mounted on top of said primary radar antenna, including
- a plate including a plurality of radiator slots arranged in at least two rows,
- a sum and difference circuit coupled to said slots, and
- second feed means coupled to said sum and difference circuit.

32. The antenna of claim 31, and further comprising: microstrip lines connecting said sum and difference circuits to said radiator slots.

33. The antenna of claim 30, wherein: said microstrip lines are triplate microstrip lines.

34. The antenna of claim 31, wherein: said plate of said secodary radar antenna is pivotally mounted on said primary radar antenna for adjusting the direction of maximum radiation.

35. The antenna of claim 31, wherein said first feed means comprises:

a further plate spaced from and extending parallel to said first plate to form a further interplate space as a waveguide.

36. A radar antenna comprising:

a primary radar antenna having a forward end and a rearward end and including
- a cylindrical parabolic reflector,
- first and second parallel plates extending spaced apart forwardly of said cylindrical parabolic reflector, and a third plate parallel and intermediate said first and second plates and spaced from said cylindrical parabolic reflector to define, with said first and second plates, upper and lower communicating interplate spaces,
- wave deflection means at the junction of said first and second plates and said cylindrical parabolic reflector,
- means defining a radiation opening at the forward end of said upper interplate space,
- means closing the forward end of said lower interplate space, and
- first feed means communicating with said lower interplate space for feeding in a primary radar signal; and a secondary radar antenna mounted on top of said primary radar antenna, including
- a plurality of unipole rods mounted in at least two rows on and perpendicular to said first plate, one of said rows in each row constituting a radiator and the others constituting reflectors and directors, and
- second feed means including passageways in said first plate communicating with said radiator rods.

37. The antenna of claim 36 and further comprising: a synthetic material cover mounted over said plurality of unipole rods.

38. The antenna of claim 36, and further comprising: a pair of covers of synthetic material each mounted over a respective row of said unipole rods.

39. A radar antenna comprising:

a primary radar antenna having a forward end and a rearward end and including
- a cylindrical paraboic reflector,
- first and second parallel plates extending spaced apart forwardly of said cylindrical parabolic reflector, and a third plate parallel and intermediate said first and second plates and spaced from said cylindrical parabolic reflector to define, with said first and second plates, upper and lower communicating interplate spaces,
- wave deflection means at the junction of said first and second plates and said cylindrical parabolic reflector,
- means defining a radiation opening at the forward end of said upper interplate space,
- means closing the forward end of said lower interplate space, and
- first feed means communicating with said lower interplate space for feeding in a primary radar signal; and a secondary radar antenna mounted on top of said primary radar antenna, including
- a plurality of unipole rods mounted in a single row perpendicular to said first plate, and
- second feed means including a sum and difference device for feeding said rows in parallel.

40. The antenna of claim 39, and further comprising:

a reflector plate mounted perpendicular to said primary radar antenna behind said row of said unipole rods; and a cover of synthetic material over said rods and supported by said reflector plate and said primary radar antenna.

41. The antenna of claim 40, wherein:

said cover also extends over and covers said radiation opening of said primary radar antenna.

* * * * *